United States Patent [19]

Weber et al.

[11] Patent Number: 5,757,596
[45] Date of Patent: May 26, 1998

[54] MOTOR CONTROL ASSEMBLY AND METHOD OF CONTROLLING SAME

[75] Inventors: Charles Francis Weber, South Lyon; Gary Michael Klingler, Milford, both of Mich.

[73] Assignee: Ford Global Technologies, Inc., Dearborn, Mich.

[21] Appl. No.: 787,509

[22] Filed: Jan. 21, 1997

[51] Int. Cl.$^6$ ............................................. H02H 5/00
[52] U.S. Cl. ........................ 361/23; 361/115; 361/191
[58] Field of Search .......................... 361/24, 23, 25, 361/115, 93, 58, 191; 318/700, 701, 704, 717

[56] References Cited

U.S. PATENT DOCUMENTS 4,896,089  1/1990  Kliman ............................. 318/701
5,247,217  9/1993  Binnewies et al. ............... 310/49

*Primary Examiner*—Jeffrey A. Gaffin
*Assistant Examiner*—Stephen Jackson
*Attorney, Agent, or Firm*—Peter Abolins, Esq.; Roger L. May, Esq.

[57] ABSTRACT

A motor control assembly and method of controlling a motor includes a three phase variable reluctance motor. Each phase includes two separate coils driven by separate driver circuits under the control of a microcomputer. The microcomputer monitors feedback from each driver circuit to determine faults or errors in the driver circuits or respective coils. In the case of a fault detection, one of the driver circuits and coils for each phase may be disabled to allow continued operation of the motor with the remaining driver circuits and coils.

18 Claims, 5 Drawing Sheets

MOTOR CONTROL ASSEMBLY AND METHOD OF CONTROLLING SAME

BACKGROUND OF THE INVENTION

1. Field of the Invention

The present invention relates generally to a motor control assembly with fault detection capability, and more specifically toward a motor control assembly and method of control of a motor in a throttle control unit for positioning the throttle plate and the detection of motor circuit errors.

2. Description of the Related Art

An electronic throttle control unit of a vehicle typically uses a motor wherein the total flux of the motor coils produces a torque at the motor shaft for positioning the throttle plate. Current through the windings of the motor is adjusted by a microcomputer controller to produce the necessary torque. If one of the coil circuits becomes inoperative within the motor, the electromagnetic field can no longer be controlled, the controller is switched off, and a spring draws the deenergized motor into a position which corresponds to the closed position of the throttle plate. In this condition, the throttle plate is closed and can no longer operate thereby making the vehicle inoperable.

One system has attempted to overcome this fault condition by utilizing two part-windings for each phase to allow one part-winding to operate during an inoperative state of the other part-winding for continued operation of the motor. Such a system is disclosed in U.S. Pat. No. 5,247,217 issued Sep. 21, 1993 in the name of Binnewies et al. The patent discloses a system for a stepper motor drive which has a two phase stepper motor and two part-windings for each phase. A controller is connected to an output stage for adjusting current through the windings. There is a dedicated output stage for each winding. Feedback is provided to the controller for monitoring functioning of the individual part-windings and for transmitting an alarm signal to the controller in the event of an inoperative state of one of the part-windings. In the event of inoperative state of one of the part-windings, the controller controls current through the remaining part-winding to at least partly take over the function of the inoperative part winding. This provides redundancy in the system. A potential problem with this system is that in the case of failed electronics, uncontrolled motor torque could occur.

SUMMARY OF THE INVENTION

The present invention is a motor control assembly including a motor having at least one phase wherein the phase includes at least first and second independent electromagnetic coils. The motor control assembly also includes a motor controller providing a control signal representative of a requested level and a disable signal. The motor control assembly further includes first and second drivers connected to the coils, respectively, to receive the control signal to energize the coils and to receive the disable signal to disable and deenergize one of the coils independent from the other of the coils.

The present invention also includes a method of controlling a motor having at least two phases. The method includes the steps of providing at least two independent electromagnetic coils for each phase A,B,C of the motor, driving each coil independently of any other coil based on a control signal feeding back information regarding coil level excitation and/or driving signal, sensing a fault in any of the coils, and disabling the coil when a fault is sensed therein allowing continued motor control through the other of the coil in a particular phase A,B,C.

One advantage of the present invention is that faults can be detected and isolated allowing continued operation of the motor. A further advantage of the present invention is that each coil of each phase is separately controlled allowing more stable operation. An additional advantage is that the coil and driver having bad or unknown state is disabled to ensure continued control of current to the motor.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
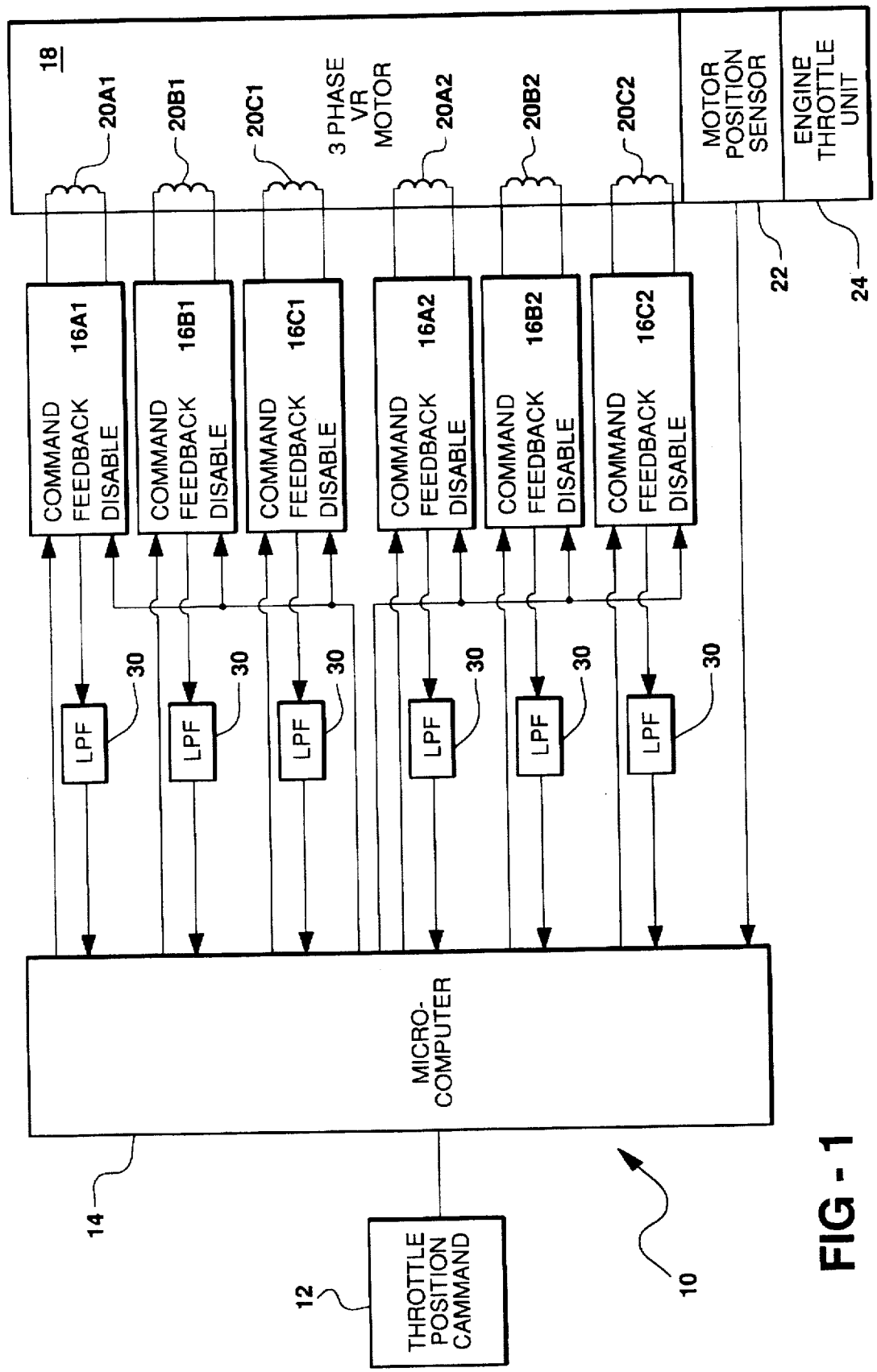
FIG. 1 is a block diagram of the motor control assembly according to the present invention.

Referring to the drawings, one embodiment of a motor control assembly 10 is generally indicated in FIG. 1. The motor control assembly 10 is utilized as part of an electronic throttle controller, though it is to be appreciated that the present invention may be used in other types of motor control applications.

As illustrated in FIG. 1, the motor control assembly 10 includes a command actuator 12, shown to be a throttle position command unit, which produces an actuator signal representative of a demanded position. The command actuator 12 is connected to a motor controller 14 which interprets the actuator signal to provide a control signal representative of a requested current level and a disable signal. The motor controller 14 is connected to a plurality of drivers 16 which receive the control and disable signals to in turn drive a motor 18. The drivers each produce a feedback signal to the motor controller 14.

The motor 18 has redundant capability in that each phase has two electromagnetic coils 20-1,2. In the embodiment illustrated, the motor 18 has three phases A, B, C, wherein each phase A, B, C has two electromagnetic coils designated as 20A1,20A2,20B1,20B2,20C1,20C2. Various number of phases may be used according to the teachings herein, e.g., one or two. In the particular embodiment, the motor 18 is a variable reluctance motor of typical configuration.

Each of the electromagnetic coils 20A1,20A2,20B1, 20B2,20C1,20C2 has a separate and independent driver 16A1,16A2,16B1,16B2,16C1,16C2 connected thereto. Therefore, the motor controller 14 can separately control each of the drivers 16A1,16A2,16B1,16B2,16C1,16C2 and the electromagnetic coils 20A1,20A2,20B1,20B2,20C1, 20C2 based upon feedback and throttle or position demands. The motor 18 includes a motor position sensor 22 which is connected to the motor controller 14. Also included is the engine throttle unit 24, as commonly known in the art.

Figure 2:
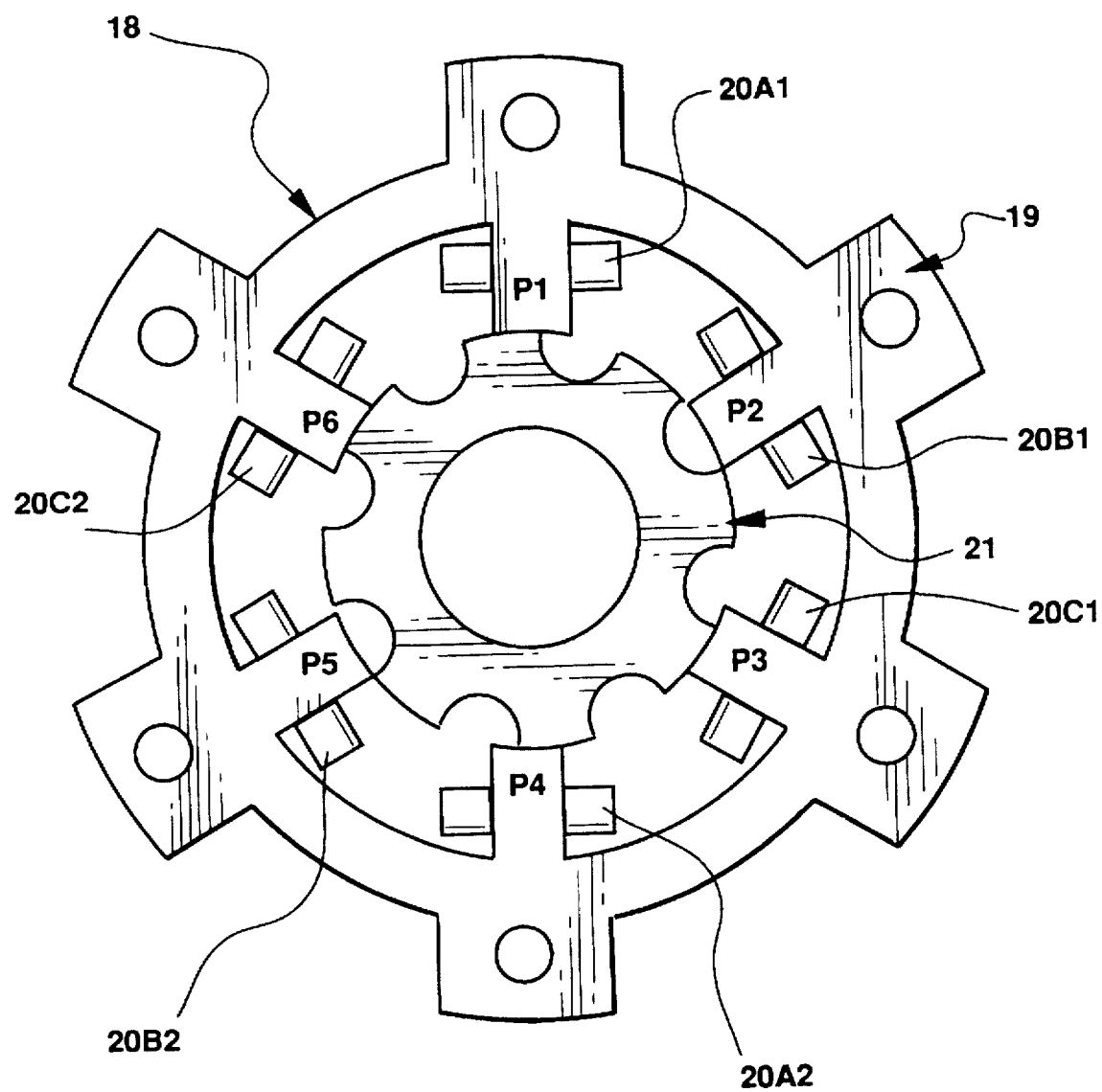
FIG. 2 is a schematic representation of the cross-section of a motor.

FIG. 2 illustrates the cross-section of the three phase variable reluctance motor 18. The motor phase A has pole pairs P1,P4 about the stator 19 to produce an electromagnetic field to rotate the rotor 21. Phases B and C include pole pairs P2,P5 and P3,P6, respectively. Unlike most automotive motor types, the variable reluctance motor 18 does not contain a permanent magnetic field. This is favorable for an electronic throttle application when considering the passive closing speed developed by the throttle return spring. When permanent magnets are used, magnetically induced residual motor shaft drag exists even when the motor circuit has been turned off. This requires a stronger return spring to meet specified passive throttle return times. Additionally, the residual drag may increase in the case of a faulty short circuited coil 20 or driver 16. The residual shaft drag of the variable reluctance motor 18 is very low and dominated by the friction of the ball bearings supporting the shaft.

Figure 3:
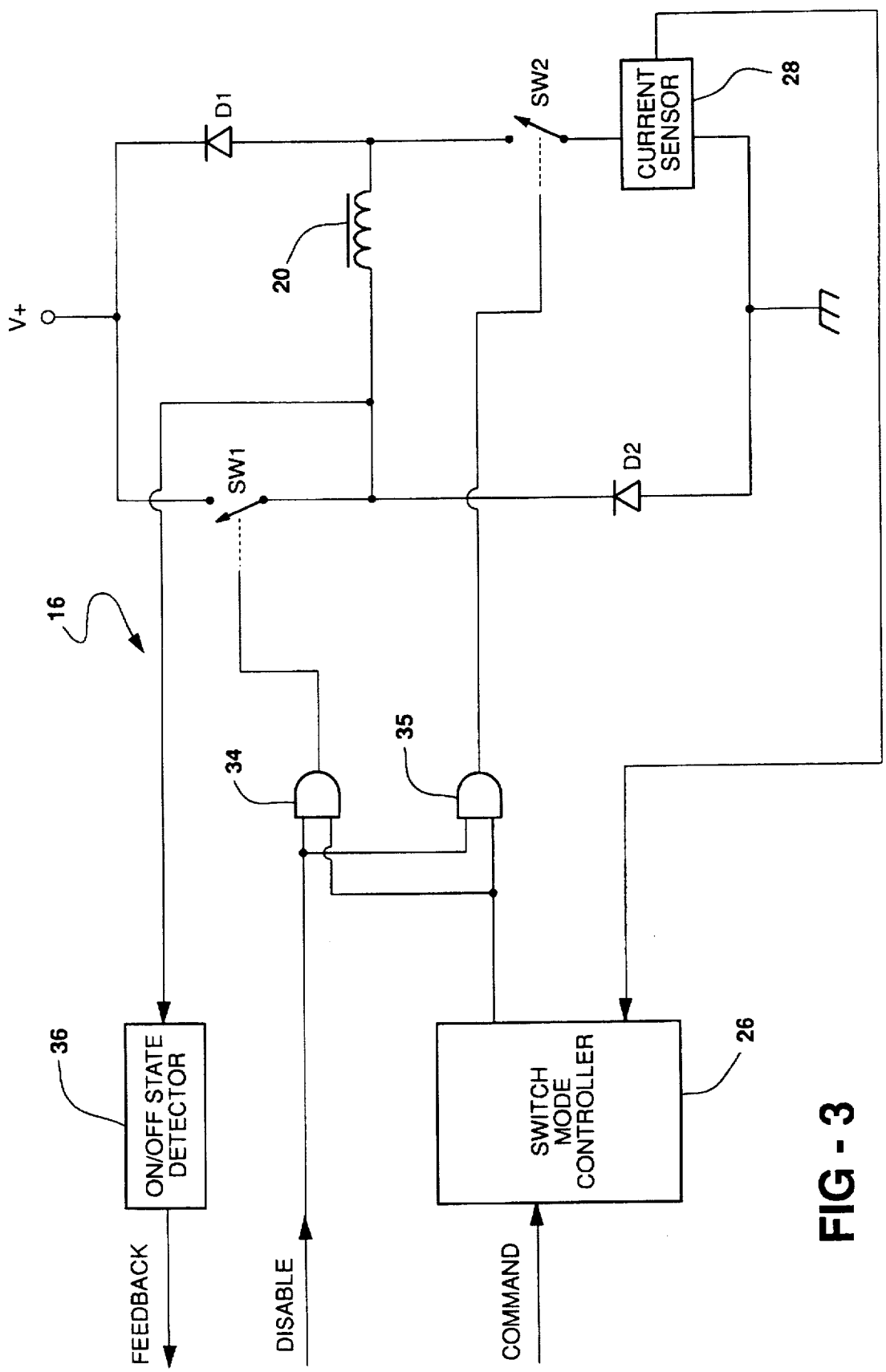
FIG. 3 is a schematic diagram of a driver illustrating a first embodiment thereof.

The driver 16 will be generally discussed though the design applies to each driver 16A1,16A2,16B1,16B2,16C1, 16C2. The driver 16 is comprised of a switch mode constant current amplifier as illustrated in FIG. 3. This type of driver 16 or amplifier is a two quadrant amplifier and runs the respective coil 20 in a continuous conduction mode. The motor controller 14 sets the desired level of current in a switch mode controller 26, having appropriate compensation for stability, which in turn drives the motor coil 20 with the appropriate current level signal. The switch mode controller 26 closes upper and lower switches SW1,SW2, simultaneously through a pair of AND gates 34,35 which also receive input of the disable signal. When the switches SW1,SW2 are closed, the motor coil current flows through a current sensor 28 and rises according to the driver voltage and the coil induction. When the coil current reaches a set point, the upper and lower switches SW1, SW2, are both opened and remain off until the start of the next cycle. The duration of the cycle is very short compared to the rate of change of current in the motor coil 20. This results in a smooth flow of coil current. It can be shown that the average result in current flow in the coil is approximated by:

$$I = V_m/R \quad \text{for } I > 0 \quad \text{eq. 1}$$

$$\text{where } V_M = V_{sys}(2D - 1) \quad \text{eq. 2}$$

$$\text{and } D = \frac{t_{on}}{T} \quad \text{eq. 3}$$

where I is the average motor coil current, $V_{sys}$ is the system voltage, $V_m$ is the average voltage applied to the motor coil, R is the motor coil resistance, D is the duty cycle, ton, is the switch on time, and T is the period of the cycle.

Since the driver 16 operates in continuous conduction, under normal conditions, the coil 20 also has current flowing through it. When the motor controller 14 sets the minimum current, there exists a small dynamic current in the motor coil 20. Under normal conditions, the monitoring of the dynamic performance of the driver 16 is key to faulty detection, as subsequently discussed.

The driver 16 uses current sensing feedback to control the motor current in response to the command signal by the motor controller 14. Using equations 1-3 above, when commanding minimum current, the switch mode controller 26 seeks the minimum current which satisfies the continuous conduction constraints. In this case, the above equations show that the switch mode controller 26 seeks an average value of D slightly larger than 0.5. This operating point is the basis in determining the goodness of the driver 16. Significant deviations from this operating point signify a fault.

The switches SW1,SW2 may be any typical type of transistor switch, or other switch as is known in the art. In the preferred embodiment, the switches SW1,SW2 are MOSFETS. The current sensor 28 may also be any type of current sensor, such as resistive sensors or current probes. The switch SW2 may be of the type of a power FET which has an internal resistance. Within this FET integrated circuit chip, the current may be internally measured and provided. This information is transmitted to the switch mode controller 26 which determines any changes in exciting the coils 20. When both switches SW1,SW2 are on, the voltage V+ is supplied to the coil 20. When the switches SW1,SW2 are opened, current remains in the motor coil 20 due to the inherent lack of instantaneous change therein. Diodes D1,D2 provide a path for current to flow across the coil 20. When the switches SW1 and SW2 are opened and closed very fast compared to the slope of the on and off times of the current, the motor coil 20 filters out the switching current so that current is relatively smooth.

The motor controller 14 is able to determine conditions in the coil 20 and respective driver 16. The drivers 16 are two quadrant amplifiers capable of applying plus and minus voltages to the load. The current stays positive. The switch mode controllers 26 operate closed loop by sensing of the current in the motor coil 20 while dynamically switching the upper and lower switches SW1,SW2, repeatedly on and off. The motor coils 20 are always conducting current, even at their minimum set value. This minimum set value is referred to as the biased idling current and is a few hundred times smaller than the full rated current. Because this is a closed loop circuit, the duty cycle D seeks to satisfy equation 1. At the idling current set point, the switch mode controller 26 dynamically seeks an average duty cycle value D of nearly 0.5 since this results in a small voltage applied to the motor coil 20. Because the driver 16 is fully dynamic and all parts of the driver 16 are active, the duty cycle feedback allows for the detection of circuit malfunction, which information is communicated to the controller 14 where the monitoring is done. The sensitivity to detect a faulty driver/coil is affected by the gain of the switch mode controller 26, wherein higher gains may be used to improve the fault detection. If the duty cycle is not within limits, an error or fault is detected.

The duty cycle feedback through an on/off state detector 36 represents the state of the switches SW1,SW2. This information is communicated from the driver 16 to the motor controller 14 where decisions are made about the dynamic performance of the driver 16 and respective motor coil 20. In the first embodiment, the duty cycle feedback signal changes from a logic 1 (5 volts) to a logic 0 (0 volts) in accordance with the switch states. This voltage is low pass filtered through an RC filter 30 to make the average value of D easy to read by the motor controller 14 through an internal analog to digital converter (not shown). In the second embodiment, the current level is sensed in similar proportions.

The motor controller 14 may be any commonly known microcomputer or processor. The motor controller 14 reads the commanded throttle position from the command actuator 12 and sets the motor coil currents. The values are selected to move the throttle 24 in order to minimize the difference in the actuator position command signal versus the measured position feedback signal. Additionally, the motor controller 14 tests the integrity of the driver 16 and motor coil 20 to determine if normal or faulty conditions exist. If a fault is detected, the driver 16 and respective coil 20 are disabled and the remaining motor coil pairs are run singularly in a reduced motor torque mode. In other words, if a fault is detected in either driver 16A1 or coil 20A1, the driver 16A1 is disabled, and one of the drivers of each of the remaining phases are disabled, such as the drivers 16B1,16C1 and coils 20B1,20C1, etc. In the preferred embodiment shown in the Figures, there are two disable lines from the motor controller 14 which separately control two sets of drivers/coils comprising the sets of A1, B1, C1 and A2, B2, C2. However, it is well within the teachings of the subject invention that separate disable lines may be connected to each driver 16 to allow separate control thereof by the motor controller 14.

Figure 4:
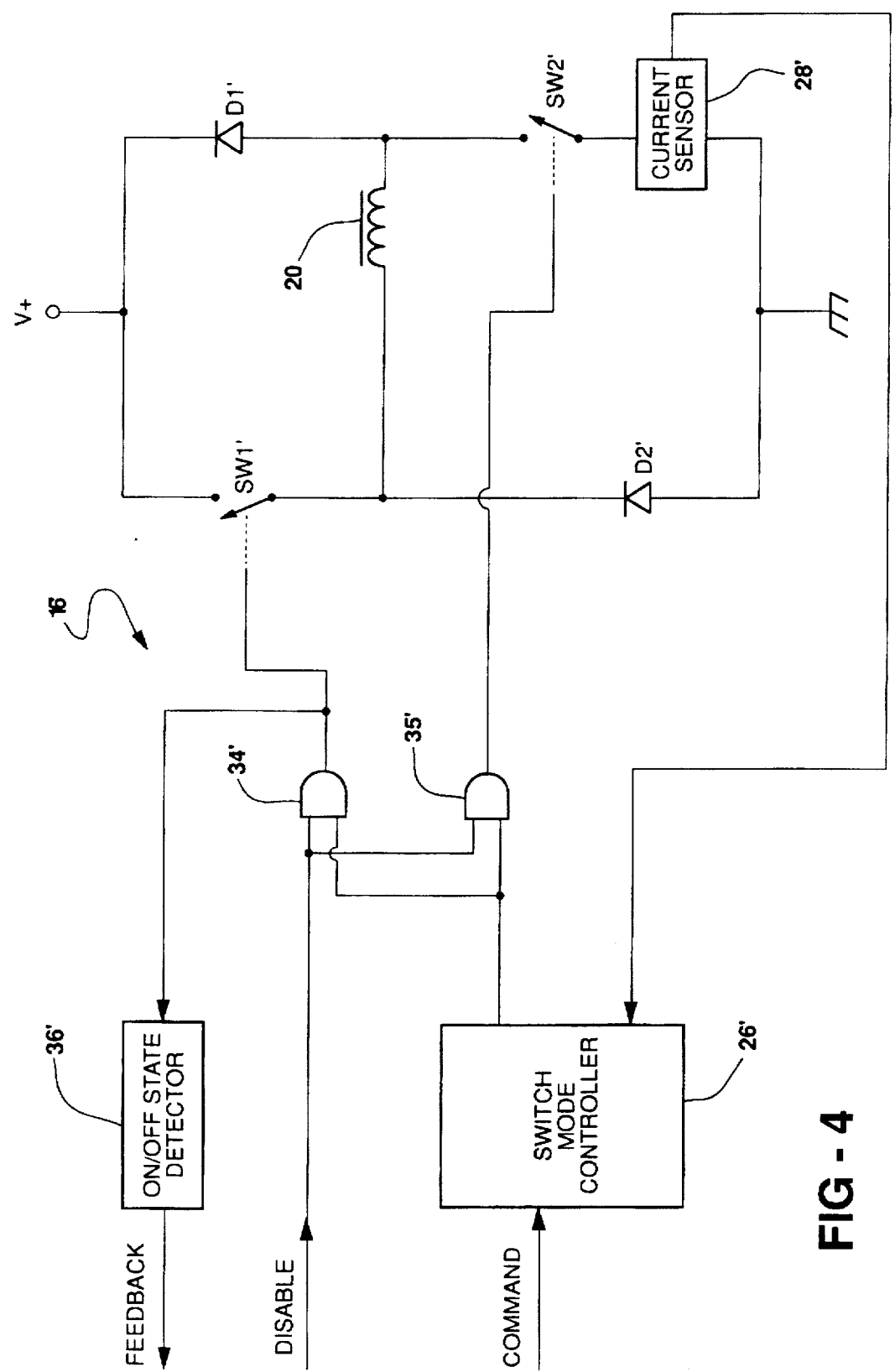
FIG. 4 is a schematic diagram of the driver of a second embodiment thereof.

There are two embodiments for obtaining the feedback signal in the driver 16, as illustrated in FIGS. 3 and 4. In FIG. 3, feedback is provided by the voltage level between switch SW1 and the motor coil 20. In the second embodiment of FIG. 4, feedback is provided by the logic state at the output of the switch mode controller 26. Both methods of sensing feedback provide duty cycle information upon which to determine whether a fault has occurred in a respective driver 16/coil 20 pair. Common references numbers are utilized to indicate common components in FIGS. 3 and 4, wherein the second embodiment utilizes primed reference numbers.

Figure 5:
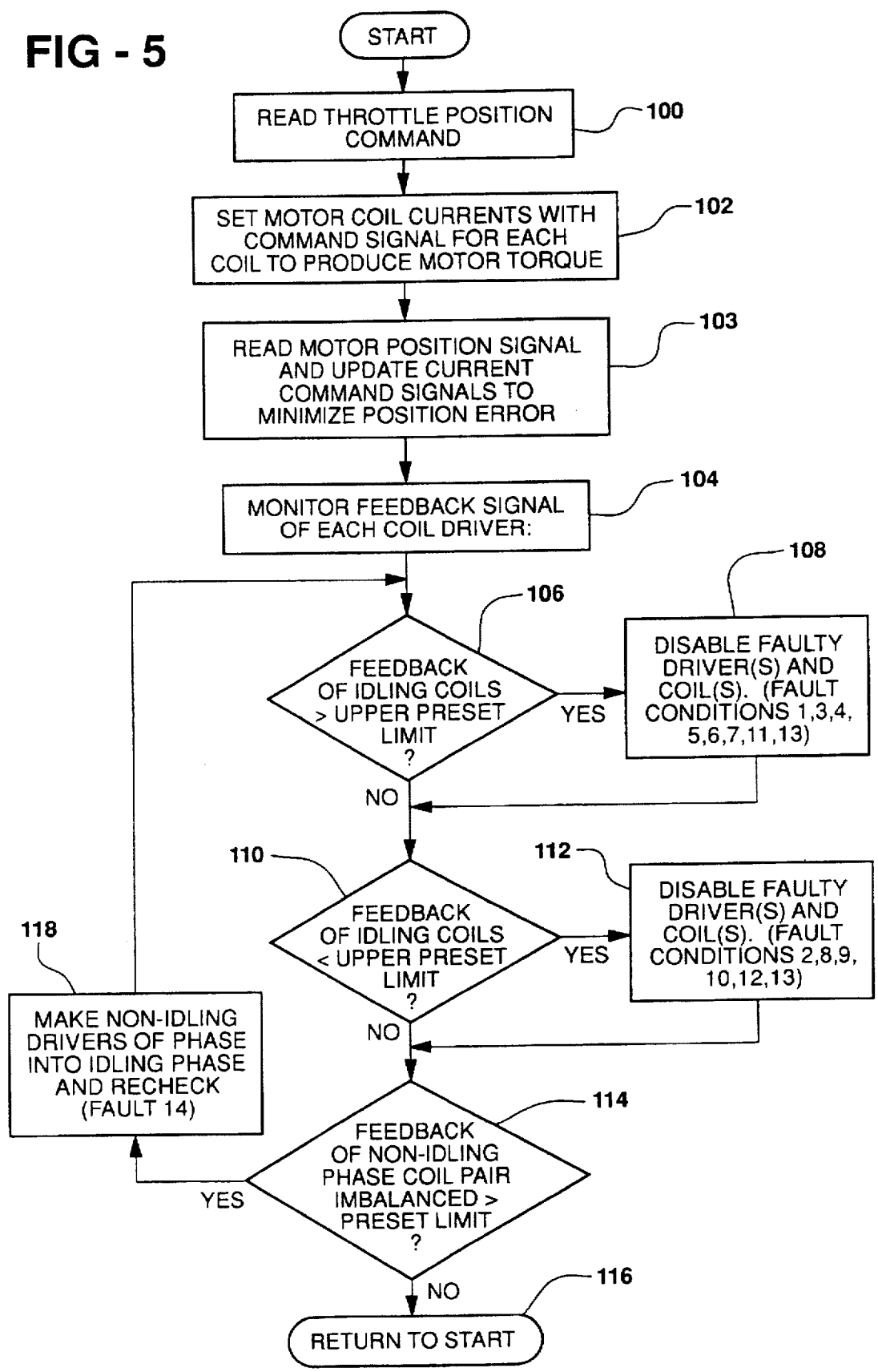
FIG. 5 is a flowchart of a method, according to the present invention, of controlling the motor control assembly of FIG. 1.

FIG. 5 illustrates the flowchart of the controller 14 for determining fault. The motor controller 14 reads the command throttle position in block 100. The motor controller 14 sets the motor coil currents in block 102 and communicates same to the respective drivers 16. Thereafter, the motor controller 14 monitors the motor position sensor 22 for continued update of its command signal in block 103. The motor controller 14 also monitors the feedback signal in block 104, either the voltage or the current depending on the embodiment to determine fault.

The motor controller 14 compares the duty cycle of each driver 16 to an upper preset limit in block 106 to determine if the upper preset limit is exceeded when in its idling mode (average duty cycle near 50%). If so, the relevant drivers 16 and coils 20 in the set with the faulty driver/coil are disabled in block 108. The motor controller 14 also compares the duty cycle of each driver 16 to a lower preset limit in block 110 to determine if the lower preset limit is passed and out of range when in its idling mode. If so, the relevant drivers 16 and coils 20 in the set with the faulty driver/coil are disabled in block 112. Lastly, the motor controller 14 compares the duty cycle of the first and second coils within a phase A,B,C in block 114 when both coils are non-idling. If an imbalance between the coils in a phase exceeds a predetermined limit, then both drivers 16 associated with the phase are commanded to the idling mode in block 118, and the faulty driver 16 is determined by returning to block 106. Otherwise, if no faults are detected, the program returns to start in block 116.

By the above algorithm of the motor control 14, the following conditions which cause the faults are determined. In the case of voltage sensing of the first embodiment illustrated in FIG. 3 the following conditions are detected.

(1) When a motor coil 20 is open, this prevents the current from rising in the current sensor 28 of the respective driver 16. The switch mode controller 26 drives the duty cycle to a large or maximum level in a futile effort to drive the current in the open load. The result is that the duty cycle is not within limits and communicated back to the controller 14 where the fault is logged and the driver 16 turned off via the upper and lower switches SW1,SW2.

(2) In the case of a shorted motor coil 20, the current rises nearly instantly. In normal operation, the inductance of the motor coil limits the rate of current rise in the driver 16. This rise time is much longer than the switching period of the driver 16. With shorted motor coil 20, the switch mode controller 26 drives the duty cycle to minimum to regulate the current at the set value. In this case, the result in duty cycle is much lower than the expected normal. The result in duty cycle is not within limit and communicated back to the controller 14 where the fault is logged and the driver 16 turned off via the upper and lower switches SW1,SW2.

(3) In the case that the upper switch SW1 is shorted, the driver 16 changes from a two quadrant controller to a single quadrant controller. In this arrangement, the switch mode controller 26 will continue to function, however, the driver duty cycle D seeks to satisfy equation 1 according to $V_m=V_{sys}(D)$. Here the value of D required to satisfy equation 1 is much smaller than equation 2. The resultant duty cycle feedback from voltage sensing is a maximum and not within limit. It is communicated back to the motor controller 14 where the fault is logged and the driver is 16 turned off via the lower switch SW2.

(4) In the case that the upper switch SW1 is open, the current will not flow in the motor coil 20 and the switch mode controller 26 will drive the duty cycle to a large or maximum value. However, because voltage sensing at the output of switch SW1 is used to communicate the duty cycle to the controller 14, the duty cycle communicated is zero and is out of limit.

(5) In the case that the lower switch SW2 is shorted, the driver 16 changes from a two quadrant controller to a single quadrant controller. In this arrangement, the switch mode controller 26 will continue to function. However, the amplifier duty cycle D seeks to satisfy equation 1 according to equation 4. Here the value of D required to satisfy equation 1 is much smaller than equation 2. The result in duty cycle is not within limit and communicated back to the controller 14 where the fault is logged and the driver 16 turned off via the upper switch SW1.

(6) When the lower switch SW2 is open, the current will not flow in the motor coil 20 making this the same as case (1). (7) The current sensor 28 may fail, such that the current sensor 28 indicates current is less than the actual amount or that current is zero when currents are present. In the simple example where the sensor element is a series resistor, this would happen if the resistor were shorted. This is the same as case (1)

(8) The current sensor 28 may fail such that the current sensor element indicates the current is much greater than the actual amount. In the simple example where the sensor is a series resistor, this would happen if the resistor was opened. This is the same as case (2).

(9) When the upper diode D1 is shorted, this also will be similar to case (2).

(10) When the upper diode D1 is opened, equation 2 is changed according to the breakdown or clamping voltage capability of the lower switch SW2. From a practical viewpoint, the lower switch may be overstressed and become inoperative either open or shorted where cases (1) or (4) would apply. Otherwise, the feedback controller would continue to function, however, the amplifier duty cycle D seeks to satisfy equation 1 according to equation 5.

$$\text{where } V_m = DV_{sys} - (1-D)V_{brkdn} \qquad \text{eq. 5}$$

The breakdown voltage of the switch is denoted $V_{brkdn}$. By design, $V_{brkdn}$ is chosen to be much larger than $V_{sys}$ and the value of V required to satisfy equation 1 is much larger than equation 2. The resultant duty cycle is not within limit and communicated back to the motor controller 14 where the fault is logged and the driver 16 turned off via the upper and lower switches SW1,SW2.

(11) When the lower diode D2 is shorted, the voltage cannot be applied to the coil 20 and the switch mode controller 26 will drive the duty cycle to a large or maximum value in an attempt to build the current. It is desirable for switch SW1 to have a current limit feature. However, because voltage sensing at the output of SW1 is used to communicate the duty cycle to the controller 14, the duty cycle communicated is zero and is out of limits.

(12) In the case that the lower diode D2 is open, equation 2 changes according to the breakdown or clamping voltage capability of the upper switch SW1. The upper switch SW1 may be overstressed and inoperative either open or shorted where cases (1) or (3) would apply. Otherwise, the switch mode controller 26 would continue to function, however, the driver 16 duty cycle D seeks to satisfy equation 1 according to equation 5 as in case 10.

(13) When the switch mode controller 26 is faulty, the switch mode controller 26 no longer seeks to satisfy equation 1. In this case, the duty cycle is either one or zero. The result in duty cycle is not within limit and communicated back to the controller 14 where the fault is logged and the driver 16 turned off via the upper and lower switches SW1 and SW2.

(14) Under typical conditions, the motor coils 20 will have currents appropriate for positioning the throttle in the commanded location. In this case, it is not practical to have operating limits on the magnitude of the duty cycle feedback value. The value is subject to a number of factors like current command value, system voltage and motor velocity. Under this condition, the ensuing duty cycle applied to the motor coils, by the switch mode controller 26 seeking to satisfy equation 1, can still be monitored. Here the value of D may be compared to the corresponding alternate coil mate of the same motor phase. The controller 14 compares the duty cycle balance of the two phase halves. If an imbalance of sufficient magnitude exceeds the predetermined limit, then both drivers 16 are commanded to the idling mode and the faulty driver 16 is determined according to cases 1 to 13.

In the second embodiment of FIG. 5, where current is monitored, cases (1'), (5'), (6'), (7'), (8'), (9'), (10'), (12')–(14') are the same as in the first embodiment. The following provide the differences.

(3) This case is similar, but where the resultant duty cycle is communicated back to the motor controller 14 and is at a minimum and out of limit.

(4) With the upper switch open, current will not flow in the motor coil making this the same as case (1').

(11) In the preferred embodiment, the upper switch SW1 shall contain a current limit feature. In this case, from a motor coil perspective, it is the same as case (1) since the voltage cannot be developed across the motor coil.

Also included is a method of controlling the motor 14. The method includes the steps of providing at least two independent electromagnetic coils 20 for each phase A,B,C of the motor 14, driving each coil 20 independently of any other coil 20 based on a control signal feeding back information regarding coil level excitation and/or driving signal, sensing a fault in any of the coils, and disabling the coil when a fault is sensed therein allowing continued motor control through the other of the coil in a particular phase A,B,C. Also included is the step of disabling one of the coils in each phase when a fault is sensed in any one of the coils 20 in any one of the phases A,B,C.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A motor control assembly comprising:
   a motor having at least a first phase wherein said first phase is comprised of first and second independent electromagnetic coils;
   a motor controller providing a control signal representative of a requested level and a disable signal when a fault in one of said coils is detected;
   first and second drivers connected to said coils, respectively, to receive said control signal and to energize said coils, and to receive said disable signal to disable and deenergize one of said coils in said first phase independent from the other of said coils when a fault is detected, and
   wherein each of said drivers includes a feedback circuit independent of the other drivers and connected to said motor controller for providing a feedback signal representative of a coil drive level.

2. A motor assembly as set forth in claim 1 wherein said motor controls a throttle valve and said control signal represents a throttle control actuator.

3. A motor control assembly as set forth in claim 1 wherein each of said drivers includes a switch mode controller for receiving said control signal and for controlling power to said coils by a power signal.

4. A motor control assembly as set forth in claim 3 wherein said motor controller operates under program control to receive said feedback signals and produce said disable signal under predetermined conditions.

5. A motor control assembly as set forth in claim 4 wherein said driver includes a current sensor for providing a current feedback signal to said switch mode controller, said switch mode controller receiving said current feedback signal and modifying said power signal to closely approximate said control signal.

6. A motor control assembly as set forth in claim 1 wherein said motor includes second and third phases, each of said second and third phases is comprised of independent first and second electromagnetic coils.

7. A motor assembly as set forth in claim 6 further including third, fourth, fifth and sixth drivers, one for each of said electromagnetic coils of said second and third phases, respectively, to receive said control signal and to energize a respective one of said coils and to receive said disable signal to disable said respective coil, wherein one of said coils of each phase receives said disable signal when a fault is detected so that said motor operates with three phases with one coil per phase.

8. A motor assembly as set forth in claim 7 wherein said motor is a three phase variable reluctance motor.

9. A motor control assembly comprising:
   a variable reluctance motor having three phases, each of said phases is comprised of independent first and second electromagnetic coils;
   a motor controller providing control signals representative of a requested level for operation of said coils each of said control signals associated with one of said coils to control each of said coils independently of the remaining coils;
   six drivers, one for each of said electromagnetic coils, respectively, to receive said control signals and to energize a respective one of said electromagnetic coils.

10. A motor control assembly as set forth in claim 9 wherein each of said drivers includes a feedback circuit for sensing circuit and coil operation and providing a feedback signal to said motor controller to determine production of a disable signal to a respective driver independent of the remaining coils, said respective driver receiving said disable signal disables and de-energizes one of said coils independent from the other of said coils.

11. A motor assembly as set forth in claim 10 wherein said motor controls a throttle valve and said control signal represents a throttle control actuator.

12. A method of controlling a motor having at least one phase, the method including the steps of:

providing at least two independent electromagnetic coils for each phase of the motor;

driving each coil independently of the other coil based on a requested signal;

sensing information regarding coil excitation level;

determining a fault in any of the coils based on the sensed information and providing a disable signal for a faulty coil independent of the remaining coils; and actively disabling a coil by receiving the disable signal when a fault is sensed allowing continued motor control through the other of the coils for each phase.

13. A method of controlling a motor having at least one phase the method including the steps of:

providing at least two independent electromagnetic coils for each phase of the motor, driving each coil independently of the other coil based on a requested signal;

sensing information regarding coil excitation level;

determining a fault in any of the coils based on the sensed information, disabling a coil when a fault is sensed allowing continued motor control through the other of the coils, and wherein the sensing information includes sensing the duty cycle of the driving signal to the coil and using the information of duty cycle for the determination of fault.

14. A method as set forth in claim 13 further including comparing the duty cycle to a preset maximum, and if larger producing said disable signal.

15. A method as set forth in claim 14 further including comparing the duty cycle to a preset minimum, and if larger producing said disable signal.

16. A method as set forth in claim 15 further including comparing the duty cycles of coils within the same phase to determine fault conditions.

17. A method as set forth in claim 16 further including providing a motor having three phases and each phase has first and second coils.

18. A method a set forth in claim 17 further including disabling one of the coils in each phase when a fault is sensed in any of the coils of any of the phases.

* * * * *